Jan. 19, 1926.  
J. C. G. BONNEY  
1,570,201  
WINDOW WASHING APPARATUS  
Filed June 25, 1923  
2 Sheets-Sheet 1

INVENTOR:  
John C. G. Bonney  
BY  
Geo. M. C. Chapman,  
ATTORNEY.

Jan. 19, 1926. 1,570,201
J. C. G. BONNEY
WINDOW WASHING APPARATUS
Filed June 25, 1923    2 Sheets-Sheet 2
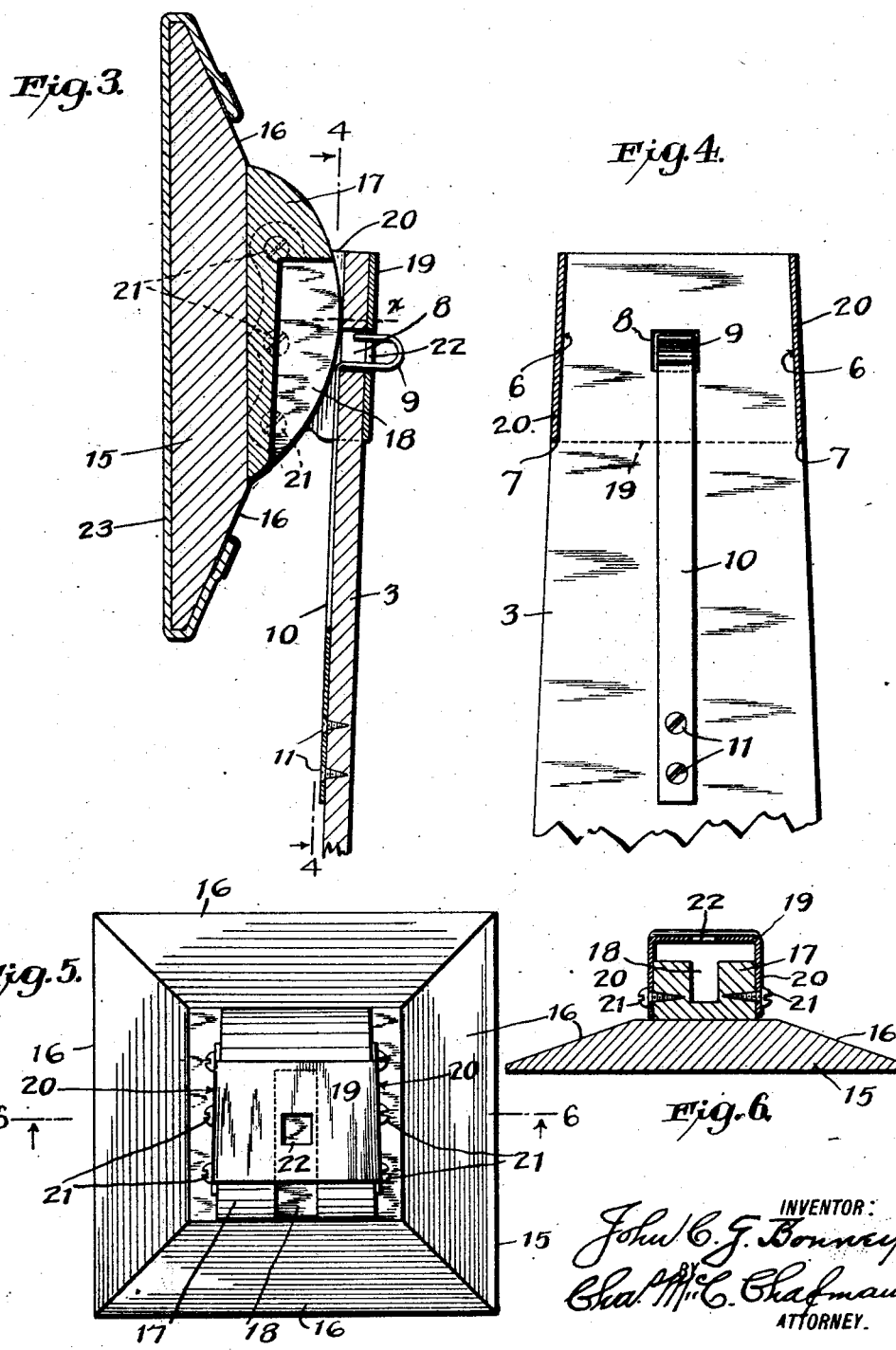

Patented Jan. 19, 1926.

1,570,201

UNITED STATES PATENT OFFICE.

JOHN C. G. BONNEY, OF BROOKLYN, NEW YORK.

WINDOW-WASHING APPARATUS.

Application filed June 25, 1923. Serial No. 647,488.

*To all whom it may concern:*

Be it known that I, JOHN C. G. BONNEY, a citizen of the United States, residing in the borough of Brooklyn, county of Kings, and State of New York, have invented a new and useful Improvement in Window-Washing Apparatus, of which the following is a description.

This invention has reference to apparatus for washing windows and similar surfaces, and, particularly, relates to certain important details of construction which are adapted to carry out the broad features of invention disclosed in my Patent #1,454,373, granted May 8, 1923.

The features of invention herein disclosed have all the objects in view and all the advantages of the forms of my invention disclosed in said patent. In addition, there are various other advantages and objects of my invention, as hereinafter disclosed, which distinguish my invention, as hereinafter claimed, from my patent construction.

In order that my invention may be clearly understood, I have provided drawings wherein the same is disclosed in connection with a simple form of apparatus, and therein:

Figure 3 is an enlarged sectional view of the padblock, pad and a portion of one of the arms to which the block is removably attached;

Figure 4 is a sectional view substantially on the line 4—4 of Figure 3;

Figure 5 is a top plan view, enlarged, of the padblock shown in Figure 1, the pad being removed; and Figure 6 is a transverse sectional view, reduced, on the line 6—6 of Figure 5.

Figure 1:
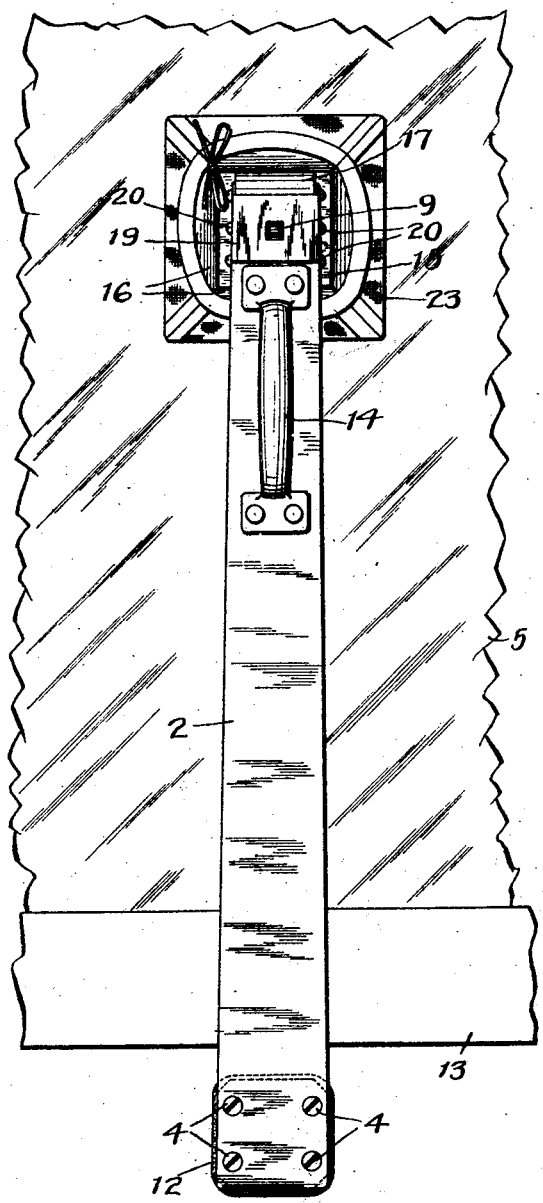
Figure 1 is a view showing an elevation of an apparatus embodying my invention looking at the front, or handle-side, the apparatus being shown in operative relation to a portion of the window-sash.
Figure 2:
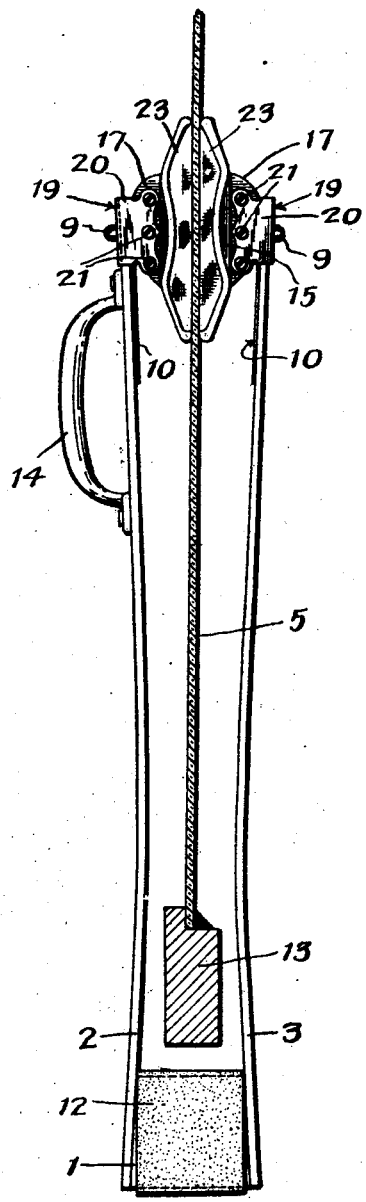
Figure 2 is a view in side elevation of the structure of Figure 1, the window sash being shown in section.

Referring to the drawings, the numeral 1 indicates the supporting block of the washer to which are secured the two arms 2 and 3, the block being tapered at its opposite sides to which the arms are secured by a plurality of screws 4, thus causing the arms to normally incline toward each other throughout their length. The arms 2 and 3 are inherently resilient so that they can be sprung apart at their free, pad-carrying ends and impose pressure upon the pad-blocks to cause the pads carried thereby to engage the window-pane 5 with sufficient friction. At their free end the arms 2 and 3 are tapered at their edges, as at 6, Figure 4, from the shoulders 7, the latter acting as stops to limit the movement of the pad-blocks thereon. By tapering the end of the arms the pad-blocks are more easily applied. Each arm near its free end is also provided with an aperture 8, transversely therethrough and centrally arranged, adapted to receive the resilient teat 9 on the end of the spring-bar 10 secured to the inner surface of the arm by screws 11. The spring-bar 10 is of proper dimensions to provide ample resilience to enable it to yield as the pad-block is slipped upon the arm and then to snap into place to hold the pad-block, as presently described; and the teat 9 is, preferably, formed integral with the bar by bending the free end thereof into U-shape, as shown in Figure 3. As shown in Figures 1 and 2, the supporting block 1 is covered or wrapped with soft material 12, such as felt, to prevent wearing or scratching the sash-frame 13, and the front bar 2 is provided with a handle 14 by which to manipulate the apparatus, said handle being fixed to the bar close to the end thereof so as to enable the apparatus to be manipulated with facility.

Viewing Figures 3 to 6, the pad-blocks 15 are shown substantially square and with inclined sides 16, the bottom surface being flat. Each block has mounted thereon, or it may be formed integral therewith, a plano-convex member 17 provided with a longitudinal groove 18 extending from its inner end and open along its curved surface, said groove being sufficiently deep, long and wide to enable the teat 9 to be depressed thereinto when the block is applied to the end of the arm. The greatest diameter of the member 17 is substantially at the line $x$, Figure 3, which is slightly beyond its center toward the outer end of the arm, this cam formation enabling the block to adjust itself automatically on the arm and to slightly rock longitudinally of the latter, so as to enable the blocks to adapt themselves automatically to the deflection of the arms angularly relatively to the surfaces of the window-panes and enable the blocks to exert even pressure over their faces on both sides of the window-panes. This is clearly shown in Figures 2 and 3. The member 17 is also slightly tapered from its inner to its outer end, correspondingly with the taper of the arms 2 and 3, and of the bridge. The member 17 has a bridge 19 secured thereto, said bridge being U-shaped and having its sides 20 secured to the opposite sides of the member 17 by a plurality of screws 21. The top of the bridge is provided with an aperture 22 adapted to register with the aperture 8 in the arm to which it is applied. The top of the bridge is inclined downwardly from its outer end, the inclination being sufficient to correspond with the outward inclination of the cooperating arm when the latter is flexed outwardly, as shown in Figure 3. As shown in Figure 5, the bridge is also tapered from its inner to its outer end, correspondingly with the tapered end of the arm and the taper of the member 17, so that the end of the arm is readily entered between the sides of the bridge and the top thereof and the top of member 17. When the inner end of the bridge engages the shoulders 7 of the arm, the parts interact snugly and the block as a whole may rock slightly upon the arm, as previously stated, but has no sidewise movement thereon.

As shown in Figures 1 to 3, inclusive, the pad-blocks 15 are provided with pads 23 which are for both cleaning and polishing or drying the windows, there being two pairs always provided for the apparatus. The pads are properly and substantially made to fit the blocks and the cleaning or washing pads are usually of rough material, while the drying pads are of smooth lintless material. The pads shown are removable and contain important features of invention not herein disclosed in detail, since they are made the subject of a companion application filed of even date herewith.

The mode of applying the pads and pad-blocks to the respective arms of the washer will be apparent upon viewing Figures 1 to 4, inclusive, it being clear that the tapered end of each arm can readily be entered into the larger end of the bridge,—the teat being depressed by pressure of the finger thereto to force said teat 9 inwardly into the groove 18 of the member 17,—until the aperture 8 and 22 register, the teat then automatically springing outwardly into position, as shown in Figure 3, to removably lock the pad-block upon the arm. The pads are first applied to the blocks, and the latter successively to the arms, the latter being sprung apart for the purpose. The apparatus, thus equipped, is applied to the window-sash, as shown in Figures 1 and 2, first at the bottom and then in reverse position at the top of each sash, and manipulated by the handle until the glass is washed when the pads are changed and the window then dried and polished.

The importance of the features of my invention as set forth in the foregoing can now be understood. The pad-blocks can slide only a limited distance upon the arms because of the shoulders 7, and when the bridge reaches the latter, the two apertures 8 and 22 are in register. The tapered form of the ends of the arms and of the bridge enables the blocks to be readily and quickly applied to the arms and a snug fit is assured. The conformation, or cam shape, of the member 17 enables it to rock to a limited extent on the arm to enable the block to adjust itself properly during the operation of washing and drying the window, and to give practically even pressure over the face of the blocks on each side of the window-pane. The inclination of the top of the bridge to correspond with the end of the arm when flexed, with the two pads in operative position, enables the two pads to always automatically adjust themselves between the arms so that the cooperating faces of the pads will always lie in a plane cutting the supporting block 1 centrally and extending longitudinally of the arms midway between the latter. During operation, the pads can rock on the arms a limited distance between them to avoid putting too much strain upon the pane and to make the operation easier.

Having thus described my invention, what I claim and desire to secure by Letters Patent is:

1. A window cleaning device comprising a pair of arms the free end of each of which is tapered; a pad-block mounted on each arm, each block having a member carrying a bridge tapered from end-to-end to correspond with the end of the arm, and each member, under the bridge, having a convexed surface cooperative with an arm, whereby the pad-blocks are prevented from having lateral movement but may have rocking movement on the arms to exert equal pressure over the faces of the blocks on both sides of the window-pane.

2. A pad-block for window cleaning devices comprising a body provided with a flat operating face and with an arcuate-shaped back having a groove therein, and a bridge secured to the back and spanning said groove.

3. A pad-block for window cleaning devices comprising an arcuate-shaped device provided with a longitudinal groove in its back and a bridge spanning the groove, said bridge being tapered from end-to-end.

4. A device of the kind described, comprising a pair of opposed resilient arms connected at one end to span a window-pane, the free end of each arm being provided with an aperture, a pad-block for each arm, each pad-block being provided with a bridge member provided with an aperture adapted to register with the aperture in the arms, and a resilient device carried by each arm and adapted to enter the apertures of the arm and bridge automatically when the apertures thereof are brought into registration.

5. In combination with a pair of resilient arms, a pad-block for each arm, each pad-block being provided with a grooved, rounded back, a bridge spanning said back and the groove therein, said bridge being provided with an aperture, each arm being also provided with an aperture and adapted to be entered under the bridge against the back, and resilient means for automatically locking the block to the arm by entering the registering apertures.

6. A window cleaner comprising a pair of resilient arms, a pad-block for each arm, each pad-block being provided with an arcuate back and a bridge spanning the arcuate portion of said back, in spaced relation thereto, the ends of said arms being detachably secured to said bridge in the space between the back and bridge.

7. A window cleaning device comprising a pair of resilient arms, each arm being provided with an aperture, and with a resilient bar secured thereto on its inner side, and having a teat adapted to pass through the aperture.

JOHN C. G. BONNEY.